United States Patent [19]

van Halderen

[11] 4,373,265

[45] Feb. 15, 1983

[54] MODIFIED CHAIN SAW

[76] Inventor: Gerardus van Halderen, P.O. Box 4237, Quesnel, British Columbia, Canada, V2J 3J3

[21] Appl. No.: 243,635

[22] Filed: Mar. 13, 1981

[51] Int. Cl.³ .............................................. B27B 17/02
[52] U.S. Cl. ............................................. 30/383; 30/371; 144/34 B
[58] Field of Search ................. 254/93 HP, 104; 144/34 A, 34 B; 30/383, 384, 385, 386, 371

[56] References Cited

U.S. PATENT DOCUMENTS

| | | | |
|---|---|---|---|
| 2,283,089 | 5/1942 | Pfauser | 254/104 |
| 2,532,981 | 12/1950 | Wolfe | 30/385 |
| 2,657,904 | 11/1953 | Evenson | 254/104 |
| 2,690,323 | 9/1954 | Evenson | 254/104 |
| 3,822,861 | 7/1974 | Scott | 254/93 HP |
| 4,172,479 | 10/1979 | Lindgren | 144/34 B |

*Primary Examiner*—Jimmy C. Peters
*Attorney, Agent, or Firm*—Mario A. Martella

[57] ABSTRACT

A chain saw has a motor, a cutting chain and a guide bar for the chain. An opening is formed in the guide bar. A flexible bladder is positioned in the opening and located on the guide bar. Fluid can be inserted into the bladder so that the bladder may be expanded. The expanded bladder can topple a cut tree without the necessity of removing the chain saw from the tree.

11 Claims, 7 Drawing Figures

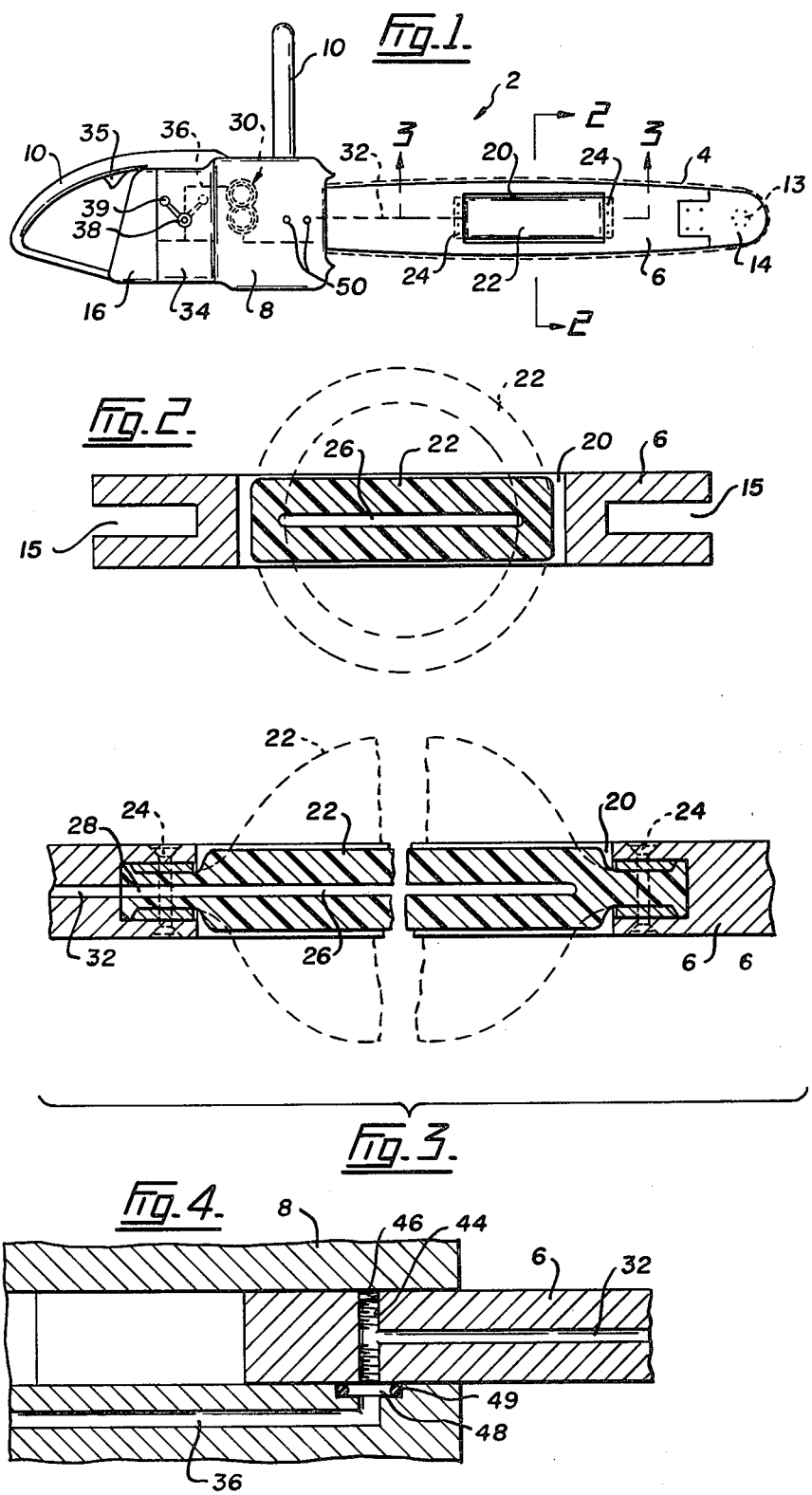

MODIFIED CHAIN SAW

FIELD OF THE INVENTION

This invention relates to a chain saw.

DESCRIPTION OF THE PRIOR ART

A chain saw is an extremely popular and efficient method of cutting wood. In logging the chain saw has virtually replaced all other methods of cutting timber. The chain saw generally comprises a housing from which a guide bar extends. The guide bar acts as a support for the chain. The housing contains a small internal combustion engine, usually a two stroke engine, a centrifugal clutch and a fuel tank.

The chain is driven by the internal combustion motor, via the centrifugal clutch, and for this purpose a small sprocket is driven through the clutch when the motor revolutions reach a certain level. The clutch is mounted on the crankshaft of the motor. The guide bar is usually clamped, for example by two bolts, to an appropriate support in the housing; the bolts normally extend through a slot in the guide bar. By this means the bolts can be slackened and the guide bar moved in or out relative to the housing to control the tension of the chain. The bolt is then retightened. On certain models there is an idler sprocket positioned on the guide bar remote from the housing so that the chain is guided at both ends of the guide bar by sprockets. However, on many models the idler sprocket is not present. The chain simply engages in a slot extending around the periphery of the guide bar. Usually the chain saw has a supply of lubricant for the blade. The lubricant is automatically applied to the chain, in the housing, although manually operable plunger systems are known.

Electrical chain saws are now used but for the obvious reason of lack of a power source such chain saws have not found wide application in commercial logging.

Using a chain saw the conventional logging techniques of cutting a V in one side of the tree and then making a straight cut on the other side of the tree is followed. The tree falls in the direction of the V-cut. Traditional practice is to cut a substantial portion of the way through the tree and then to use wedges to complete the severing of the tree from its stump. The use of wedges provides better control of the direction of fall. Originally the wedges were simply hammered in but there has been some development in the use of hydraulic and pneumatic wedges. For example Lindgren in U.S. Pat. No. 4,172,479 discloses an inflatable wedge attachment. In Lindgren the internal combustion engine of the saw chain is used to inflate the wedge at the appropriate time. That is the necessary cuts are made, the chain saw is then withdrawn and the wedge inserted and inflated to topple the tree.

Scott in U.S. Pat. No. 3,822,861 discloses an inflatable wedge made of a tough material. U.S. Pat. No. 2,283,089 to Pfauser and U.S. Pat. No. 2,657,904 to Evenson disclose hydraulic wedges for felling trees or the like in which hydraulic fluid is pumped into the wedge at the appropriate time to topple the tree.

Pneumatic pressure, as in the Lindgren device, is typically developed from an internal combustion engine, possibly from the chain saw motor, by use of a special adapter spark plug. However, there can be problems in its use. To generate the necessary pressure the chain saw motor must be allowed to run at a high idle, often sufficiently high to engage the clutch and thus drive the blade. This is undesirable as the operator must concentrate on the wedge, not the chain. The tube can entangle with the blade during cutting, which is also dangerous and the removal of the chain saw followed by the insertion of the wedge can be relatively time consuming.

SUMMARY OF THE INVENTION

The present invention seeks to provide a chain saw in which a wedge, or at least an inflatable bladder, is used but in which the device can be used without removing the chain saw from the cut. The intention is to simplify and make safer the operation of a chain saw in combination with a toppling device and to speed the cutting of trees.

Accordingly, in a first aspect, the present invention is a chain saw having a motor, a cutting chain and a guide bar for the chain and is the improvement comprising an opening formed in the guide bar, a flexible bladder positioned in the opening and located on the guide bar and means permitting access to the bladder to insert fluid into the bladder so that the bladder may be expanded.

Preferably, the saw is provided with a pump adapted to communicate with the access to the bladder so that the fluid may be added to *and* removed from the bladder by pump. The pump may be driven by a power take-off from the chain saw motor; for example from the clutch.

In this regard the pump can be an external device, for example a simple piston and cylinder, but in the preferred embodiment of the invention the pump is formed integrally with the chain saw.

Indeed in a preferred embodiment the invention is a chain saw comprising a housing to contain a motor and a clutch and to receive a locating guide bar; a sprocket driven by the motor; a chain driven by engagement with the sprocket; a guide bar for the chain; an opening in the guide bar; a bladder located in the opening; a passageway in the bladder to communicate the interior and the exterior of the bladder; a first channel in the bar to communicate with the bladder passageway; a reservoir for fluid in the housing; a pump on the chain saw; drive means for the pump; a second channel in the housing to allow fluid to be pumped from the reservoir through the second channel, to the first channel and to the bladder to inflate the bladder.

The above embodiment preferably includes a valve movable between two positions, a first position in which the pump can pump fluid from the reservoir to the bladder and a second position in which the fluid is pumped from the bladder to the reservoir. There are external control means for the valve.

In yet a further aspect the invention is a cover for a chain saw adapted to fit on the motor housing of the chain saw and including passageways to connect to a reservoir of hydraulic fluid and to a pathway in a guide bar of the saw; a pump to pump fluid to and from the reservoir through the passageways; drive means for the pump; and means to control the pumping direction.

BRIEF DESCRIPTION OF THE DRAWINGS

Aspects of the invention are illustrated, merely by way of example, in the accompanying drawings, in which:

FIG. 1 is a general view of a chain saw according to the present invention;

FIG. 2 is a section on the line 2—2 in FIG. 1;
FIG. 3 is a section on the line 3—3 in FIG. 1;
FIG. 4 is a detail of the chain saw of FIG. 1.

DESCRIPTION OF THE PREFERRED EMBODIMENTS

Figure 7:
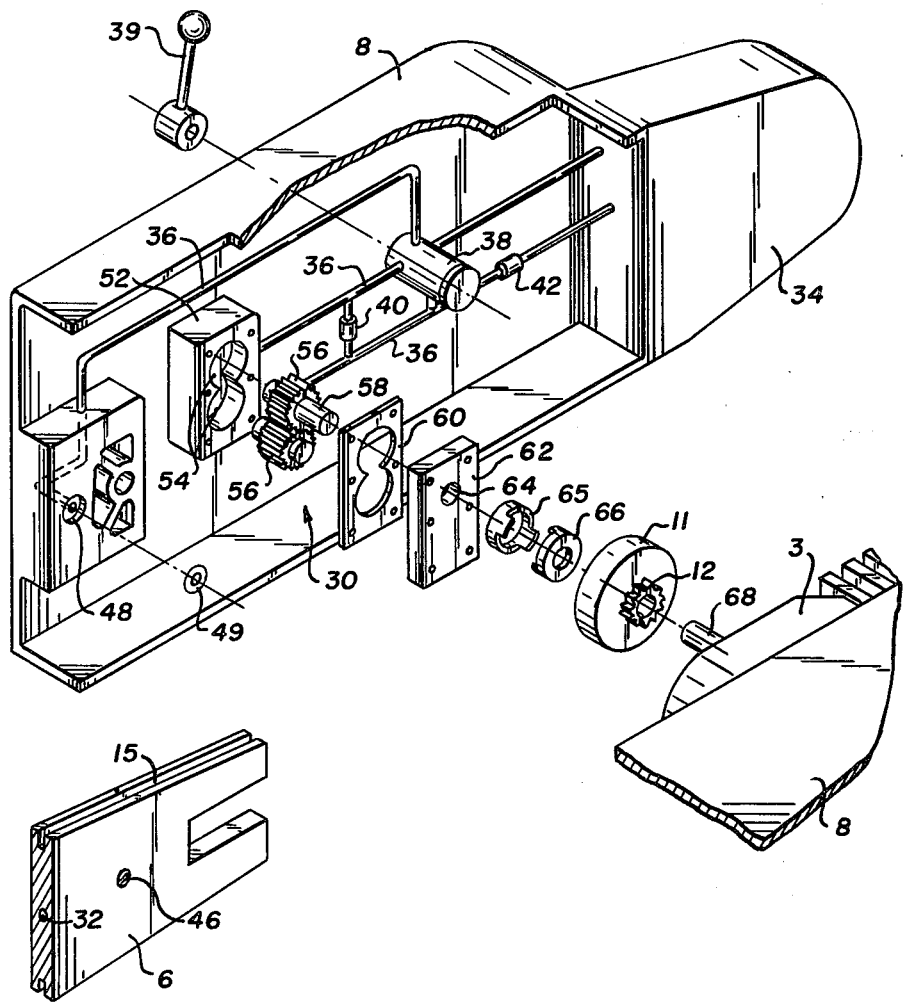
FIG. 7 shows a cover according to the invention.

The drawings illustrate a chain saw 2 having a motor 3 (see FIG. 7), a cutting chain 4 and a guide bar 6 for the chain 4. The motor is located in a housing 8 to which, as is conventional, are attached handles 10. A throttle control 35 for the motor is provided on one handle 10. The chain 4 is driven by the motor 3 through a centrifugal clutch 11 (part of which is shown in FIG. 7) and a sprocket 12, both of which are entirely conventional in the chain saw art. It should also be noted that the guide bar 6 illustrated in FIG. 1 has a nose sprocket 13 housed within an end piece 14 to facilitate movement of the chain 4. Again as is conventional the chain saw has a fuel tank 16 and a supply of lubricant (not shown) so that the chain may be lubricated, usually automatically but possibly by the operator depressing an external plunger. As perhaps most clearly illustrated in FIG. 2 the guide bar 6 is formed with a groove 15 at its periphery to guide the chain. This again is conventional.

According to the invention the guide bar 6 is formed with an opening 20. There is a flexible bladder 22 positioned in the opening 20 and located on the guide bar 6 by rivets 24 as shown in FIG. 3. The bladder 22 has an internal recess 26 and a passageway 28 extending to the outside, that is communicating the interior and the exterior of the bladder 22.

In the preferred embodiment illustrated the chain saw 2 includes a pump 30 that may be a simple rotary pump and there is a channel 32 communicating with the bladder and with the end of the bar 6. There is a reservoir 34 for hydraulic fluid formed in the housing. The apparatus also includes passageways 36 within the housing (shown schematically in FIG. 1) connecting the reservoir 34 and the pump 30 and channel 32. There is a two way valve 38 positioned within the passageways 36 with external handle 39, as shown in FIG. 1, extending from the valve 38 to the exterior of the chain saw 2.

Figure 5:
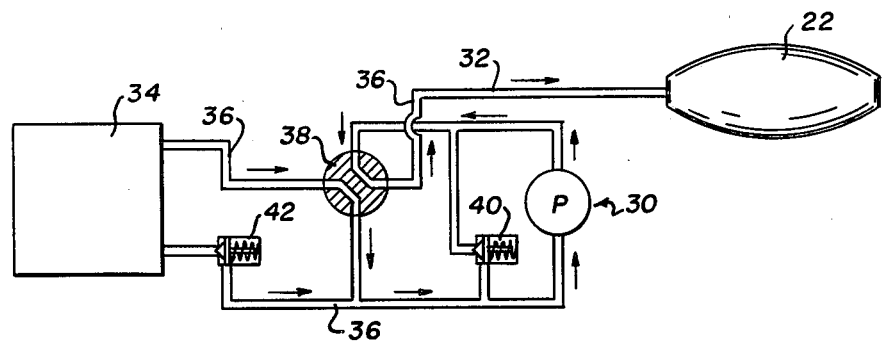
FIGS. 5 and 6 illustrate diagrammatically the hydraulic circuitry of a preferred embodiment.
Figure 6:
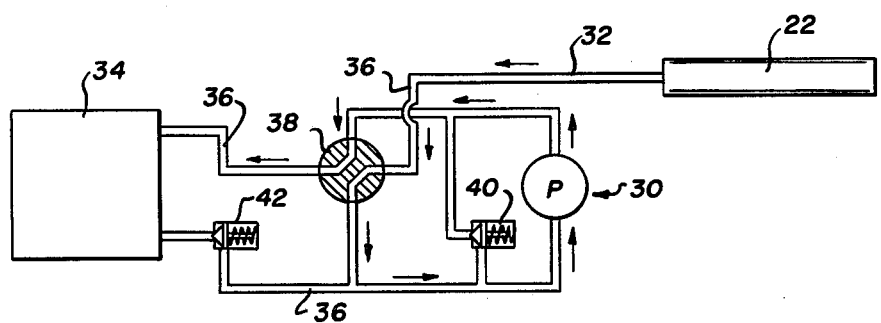

The hydraulic circuitry is illustrated in detail in FIGS. 5 and 6. FIG. 5 illustrates the position of the valve 38 to inflate the bladder 22. In the position illustrated in FIG. 5 hydraulic fluid passes along passageways 36 from the reservoir 34 through the valve 38, through the pump 30, back through the valve 38, to channel 32, to the bladder 22. With the valve 38 in the position illustrated in FIG. 5, and with the pump 30 operating, the bladder 22 is thus inflated.

When the valve 38 is switched to the position in FIG. 6 the effect is to deflate the bladder 22. This forced deflation is considered desirable. In the position illustrated in FIG. 6, fluid is pumped through channel 32 from the bladder 22, into passageways 36 through the valve 38, through the pump 30, back through the valve 38 and back to the reservoir 34. It should be noted that as is conventional in hydraulic circuitry there is a pressure relief valve 40 and a vacuum break 42. The pressure relief valve 40 is desirably designed to operate at a pressure of 1000 pounds per square inch. The vacuum break can operate at a vacuum of 10 inches. The pressure relief valve prevents the hydraulic pump 30 overloading. For additional assistance in this regard the volume of tube 34 is less than or equal to the volume of bladder 22 expanded at 1000 p.s.i.. The vacuum break prevents the pump 30 burning out when the saw is operating and the bladder 22 is thus being deflated.

FIG. 4 illustrates the communication of channel 32 and passageway 36. They communicate through a threaded opening 44. The threaded opening 44 is closed at one end with a plug 46. This is to permit the guide bar 6 to be turned over so that there is even wear on the guide bar 6 by the chain 4. This is a standard practice. It should be noted that there is an enlarged portion 48, sealed with an O-ring 49, at the end of the passageway 36. This is to ensure that the channel 32 and passageway 36 remain in communication regardless of the position of the guide bar 6 relative to the housing 8. As indicated the relative positions of the housing 8 and the guide bar 6 may be altered by the operator to control the tension of the chain 4. This is done by loosening bolts 50, positioning guide bar 6 then retightening bolts 50.

FIG. 7 principally illustrates a further aspect of the present invention which is simply a cover for a chain saw. According to the invention a cover may be provided having the necessary conduit 36, valve 38, and pump 30 built in. The covers could be designed as separate components, one cover to fit a particular model of chain saw. FIG. 7 also illustrates more clearly the structure and drive of pump 30. As shown particularly in FIG. 7 the pump 30 may comprise a housing 52 having joined openings 54 formed in it. There is a rotor 56 positioned in each opening 54 and the rotors 56 engage each other. The upper rotor has a shaft 58 extending outwardly. There is a gasket 60 and a cover 62 for the pump formed with an opening 64 through which the shaft 58 extends. The shaft 58 engages a dog member 65 which, in turn, engages a corresponding dog member 66 attached to the crankshaft 68 of the motor 3. The arrangement is such that the pump 30 is constantly driven while the motor 3 is driven.

The drawing also illustrates the pressure relief valve 40 and the vacuum brake 42. This cover may be attached by conventional means and, in particular using the means that the conventional cover, before replacement by the cover shown in FIG. 7, uses.

It should also be pointed out that the mutually engaging dogs 65 and 66 may be replaced by using a nut on the end of the crankshaft, as is conventionally used to locate the clutch and centrifugal weights, and to fit on the end of shaft 58 a member internally shaped to be a close fit over the crankshaft nut.

To use the apparatus according to the present invention, first the chain saw 2 is used conventionally, that is a V-cut is made on one side of the tree and a straight cut made on the other side of the tree. During this operation the valve 38 is in the position shown in FIG. 6, that is the bladder 22 is kept flat, within the confines of the guide bar 6 as shown in solid lines in FIGS. 2 and 3, so that it does not interfere with the operation of the chain 4 and, of course, is not itself damaged. When the appropriate cut has been made then the valve 38 is switched to the position shown in FIG. 5. By this means the bladder 22 is inflated and the tree thus toppled. It has been found that using the apparatus of the present invention a pressure of 1000 pounds per square inch can easily be obtained and this is sufficient to topple an extremely large tree.

The inflated position of the bladder is, of course, shown in broken lines in FIGS. 2 and 3. As soon as the tree topples the valve is moved to empty bladder 22.

It has been found that a neoprene bladder reinforced with fabric is satisfactory. Clearly the walls of such a bladder must be reasonably thick to withstand the pressure involved.

It should be noted that the internal pump 30, reservoir 34 and valve 38 may be dispensed with and an external pump, resembling a grease gun or a similar piston and cylinder arrangement, can be attached to the passageway 32 as shown in FIGS. 5 and 6. The use of the saw is then as follows: The appropriate cuts are made with the bladder deflated and the bladder is then inflated by use of the piston and cylinder. The tree is toppled and the fluid may then be pumped out of the bladder back into the piston and cylinder arrangement. This second embodiment has the advantage of cheapness but is not as compact nor as convenient to use as the preferred embodiment illustrated in FIGS. 1 to 7.

I claim:

1. In a chain saw having a motor, a cutting chain and a guide bar for the chain the improvement comprising an opening formed in the guide bar;
    a flexible bladder positioned in the opening and located on the guide bar;
    means permitting access to the bladder to insert fluid into the bladder so that the bladder may be expanded.

2. A chain saw as claimed in claim 1 further including a pump adapted to communicate with the access to the bladder so that fluid may be added to and removed from the bladder.

3. A chain saw as claimed in claim 1 in which the access to the bladder comprises a channel in the guide bar, extending to the bladder.

4. A chain saw as claimed in claim 1 including a reservoir for hydraulic oil;
    a pump;
    a channel communicating with the bladder, with the pump and with the reservoir; and
    drive means for the pump.

5. A chain saw as claimed in claim 4 including a valve selectably movable between two positions, a first position in which oil is pumped from the reservoir to the bladder and a second position in which oil is pumped from the bladder to the reservoir.

6. A chain saw as claimed in claim 4 in which the drive means for the pump comprises a power take off from the motor of the chain saw.

7. A chain saw comprising a housing to contain a motor, a clutch and to receive a locating guide bar;
    a sprocket driven by the motor;
    a chain driven by engagement with the sprocket;
    a guide bar for the chain;
    an opening in the guide bar;
    a bladder located in the opening;
    a passageway in the bladder to communicate the interior and the exterior of the bladder;
    a first channel in the bar to communicate with the bladder passageway;
    a reservoir for fluid in the housing;
    a pump on the chain saw;
    drive means for the pump;
    a second channel in the housing to allow fluid to be pumped from the reservoir through the second channel, to the first channel and to the bladder to inflate the bladder.

8. A chain saw as claimed in claim 7 including a valve movable between two positions, a first position in which the pump can pump fluid from the reservoir to the bladder and a second position in which the fluid is pumped from the bladder to the reservoir;
    external control means for the valve.

9. A chain saw as claimed in claim 7 in which the second channel includes a pressure relief valve.

10. A chain saw as claimed in claim 7 in which the channel includes a vacuum break valve.

11. A chain saw as claimed in claim 7 in which the saw includes means to permit the guide bar to be moved relative to the housing to control tension of the chain on the guide bar;
    an enlargement of the first or of the second channels where the two channels meet to provide means of maintaining communication between the channels at all useful relative positions of the housing and the guide bar.

* * * * *